E. I. DODDS.
STAY BOLT.
APPLICATION FILED SEPT. 21, 1912.
1,077,052.
Patented Oct. 28, 1913.
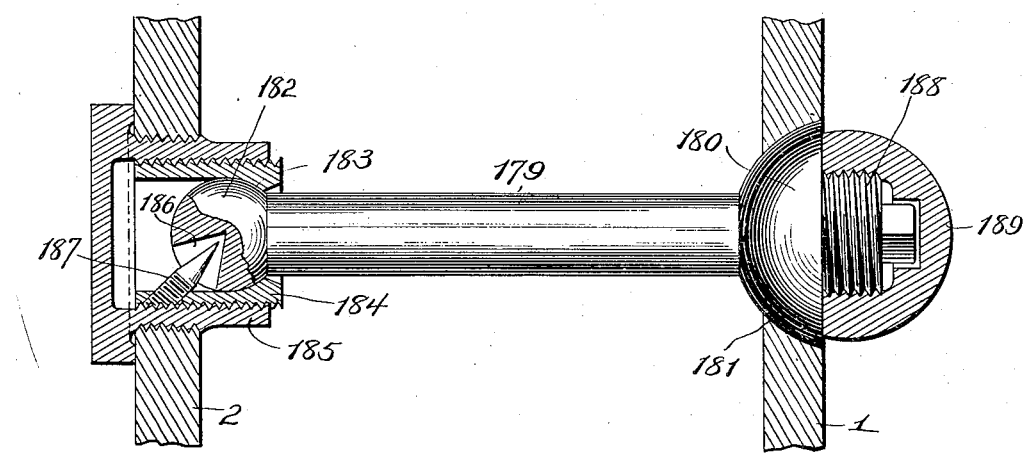

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,052. Specification of Letters Patent. Patented Oct. 28, 1913.

Original application filed September 25, 1911, Serial No. 651,051. Divided and this application filed September 21, 1912. Serial No. 721,674.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

A further object is to so connect the bushing at one end of the bolt shank with the latter, that the bushing may be inserted into its sleeve or outer bushing and turned by turning the bolt.

The accompanying drawing is a view in elevation partly in section of a bolt embodying my invention.

1 represents the inside plate of a locomotive boiler and 2 the outside plate. Mounted in the outside plate 2, is the thimble bushing 185, provided internally with threads to engage the external threads on the inner bushing or connector 184, which is provided with a concave seat 183 for the spherical head 182 of the bolt shank 179. The head 182 is provided with a socket 186 in which the tapering end of the stud 187 rests. This stud is screwed or otherwise secured to the inner bushing 184, and projects into the socket 186, the latter being of a size sufficient to allow of a limited play or movement of the head 182 to accommodate the maximum required angular movement. The opposite end of the bolt shank 179 is provided with an integral head that directly engages a concave seat formed in the wall 1. The extreme end of the bolt adjacent head 180 is threaded as shown at 188 to receive the cap nut 189 which latter when in place, forms a continuation of the head 180 and also covers and incloses the angular end to which a wrench is applied for turning the bolt. The hole 181 through the inside plate should be of a size to permit the opposite end of the bolt with its bushing 184 thereon to be passed through same, and into engagement with the outer bushing 185. After the inner bushing has been alined with the outer bushing, it will be seen that by turning the bolt shank the inner bushing will be entered in the outer bushing and when the parts are in place the head 182 rests solidly on its concave seat 183 and the head 180 closes the hole in the outer wall and rests solidly in its concave seat in said wall.

I make no claim in this application specifically to a ball shaped member having a recess in one side thereof and a socketed member carrying a key which rests loosely in the recess in the head, as such construction is shown and claimed in my pending application No. 721,679 filed September 21st, 1912.

Having fully described my invention what I claim as new and desire to secure by Letters-Patent, is:—

1. The combination with a bushing to be secured to one wall of the boiler, of a stay bolt consisting of a shank having an integral rounded head, a sleeve like connector on the shank and provided with an internal seat for the rounded head and external threads for its attachment to the bushing, means for limiting the relative rotary movement of the bolt and connector and means for flexibly connecting the other end of the bolt shank to the other wall of the boiler.

2. The combination with the two walls of a boiler one having a hole therein and a concave seat around the hole and the other carrying a threaded bushing, of a bolt having two rounded heads one larger than the other and adapted to rest in the concave seat in the boiler wall, the smaller head carrying a connector for attachment to the bushing in the other wall of the boiler and means for limiting the relative rotary movement between said bolt and connector.

3. A stay bolt comprising a bolt shank having two integral rounded heads one larger than the other the smaller head carrying a connector and means for limiting the relative rotary movement between said bolt and connector.

4. The combination of a bushing threaded exteriorly and internally and closed at its outer end, and a bolt having a rounded head, an externally threaded sleeve like connector carried by the shank of the bolt and having a seat against which the head of the bolt bears and means for limiting the relative rotary movement of the bolt and connector.

In testimony whereof, I have signed this specification in the presence of two subscribing witnesses.

ETHAN I. DODDS.

Witnesses:
A. W. BRIGHT,
GEO. F. DOWNING.